United States Patent [19]

Tamas et al.

[11] Patent Number: 4,576,637

[45] Date of Patent: Mar. 18, 1986

[54] PROCESS FOR PREPARING SILICON-BASE COMPLEX FERROUS ALLOYS

[75] Inventors: Istvan Tamas; Szilard Riederauer, both of Budapest; Janos Kovacs, Salgotarjan, all of Hungary

[73] Assignee: Vasipari Kutato es Fejleszto Vallalat, Budapest, Hungary

[21] Appl. No.: 651,849

[22] Filed: Sep. 18, 1984

[51] Int. Cl.⁴ .............................................. C22B 4/00
[52] U.S. Cl. ....................................... 75/10 R; 75/12
[58] Field of Search ............................ 75/10 R, 11, 12

[56] References Cited

U.S. PATENT DOCUMENTS

| | | | |
|---|---|---|---|
| 4,155,753 | 5/1979 | Ryabchikov | 75/10 R |
| 4,229,214 | 10/1980 | Shushlebin | 75/10 R |
| 4,255,184 | 3/1981 | Nakamura | 75/10 R |
| 4,435,209 | 3/1984 | Johansson | 75/10 R |

*Primary Examiner*—Peter D. Rosenberg
*Attorney, Agent, or Firm*—Young & Thompson

[57] ABSTRACT

A process for the continuous preparation of silicon-base complex ferrous alloys from cheap raw materials by preparing a charge with a high electric resistance and reducing the same in an electric arc furnace. A charge is assembled which contains the total amount of carbon in a 0.82 to 0.99-fold quantity of that required to reduce all oxides of the charge to elements and achieving this carbon content by preparing pellets which, in addition to the binding material, contain (a) as oxide to be reduced in an amount of at least 50% by weight such oxides of only base-forming or only amphoteric or only acid-forming elements which form with each other compounds or eutectics melting above 1600° C., and (b) a carbonaceous reducing agent and/or carbides in such an amount that the quantity of carbon is either 1.05 to 1.35 times higher than required to transform the oxides of the pellet to the carbides or 0.66 to 0.02-fold of the quantity required to reduce the oxides of the pellet to metallic elements, and assembling the charge (α) from pellets containing an excess of carbon and/or from lumpy carbides and (β) from carbon-deficient pellets or from a lumpy oxide of a base-forming or amphoteric or acid-forming element and (γ) from lumpy carbon carriers, and optionally (δ) from an iron additive, in the absence of boron trioxide.

2 Claims, No Drawings

PROCESS FOR PREPARING SILICON-BASE COMPLEX FERROUS ALLOYS

This invention relates to the preparation of silicon-base complex ferrous alloys.

In the metallurgy of iron, the silicon-base complex ferrous alloys are used for alloy building, modification, desulphurization and deoxidation of both the cast iron and steel as well as for the stabilization of carbon. However, the silicon-base complex ferrous alloys are suitable only to solve these tasks when, in addition to the iron and silicon as basic components, the elements fitting for the desired aims are present therein. These elements, playing the primary role of realizing the objects mentioned above, will be named as main components hereinafter and put in parentheses in order to distinguish them (from the iron and silicon as basic components always present in the alloys and from the carbon, phosphorus and sulphur contaminants being present in low quantities and therefore not designated).

Depending on the number of the main components present in a given alloy, the following types are distinguished:

Unary silicon-base complex ferrous alloys, such as e.g. FeSi(Ti), FeSi(Zr), FeSi(V), FeSi(Al), FeSi(Cr), FeSi(B), FeSi(Mn), FeSi(Mg), FeSi(Ca), FeSi(Ba), FeSi(Ce), etc.

Binary silicon-base complex ferrous alloys, such as e.g. FeSi(Ti,Zr), FeSi(Zr,Cr), FeSi(Al,Cr), FeSi(Al,Ca), FeSi(Al,Ba), FeSi(Al,Ce), FeSi(Al,Mn), FeSi(Ti,Mn), etc.

Ternary silicon-base complex ferrous alloys, such as e.g. FeSi(Ti,Zr,Cr), FeSi(Al,Cr,Ca), FeSi(Al,Ca,Ba), FeSi(Al,Ca,Ce), etc.

Quaternary silicon-base complex ferrous alloys, such as e.g. FeSi(Zi,Zr,Cr,Al), FeSi(Al,Cr,Ca,Ba), FeSi(Al,Zr,Ca,Ce), etc.

The methods known for the preparation of silicon-base complex ferrous alloys are as follows:

In the one-stage carbothermal process the silicon and the main components are reduced from their oxides by a carbon-containing reducing agent.

In the multi-stage carbothermal and carbidothermal process one part of the silicon and/or of the main components are reduced from their oxides with a carbon-containing reducing agent and silicon carbide and/or with a product containing the carbides of the other part of the main components.

In the two-stage silicothermal process the main component is formed by reducing its oxide with silicon prepared in the furnace.

In the three-stage silico-aluminothermal process the main component is formed from its oxides by reduction with FeSi prepared in the furnace and with aluminium prepared separately by electrolysis.

In the multi-stage fusion process FeSi is fused with the main components prepared in separate stages.

Out of the processes listed above, the first, so-called carbothermal method has proved generally to be most economical. However, in the course of the manufacture of a number of silicon-base complex ferrous alloys an important amount of slag arises which not only decreases the economicalness of the process but, when the slag has a high melting point and contains carbides, it cannot flow out of the furnace and the production cannot be continued: either the charge should be charged or the furnace should be stopped and started again. The difficulties are particularly high when the utilization of coals with a high ash content and low caloric value, slags and flying ashes of power stations is desired. This bears a particularly great importance since in this way the economicalness of the production could be based on a large amount of extraordinarily cheap raw materials.

According to the process described in the Soviet patent specification No. 675,085, a binary silicon-base FeSi(Al,Ca) complex ferrous alloy can be prepared by using a charge containing 29 to 42% of blast furnace slag, 50 to 59% of stone coal with a high ash-content, and a material with 8 to 12% of iron. By using this process, however, instead of the theoretical value of 1.61 kg, only 1 kg of an alloy containing 40 to 45% of silicon, 10 to 15% of aluminium, 8 to 15% of calcium, and 25 to 35% of iron is obtained from 1.5 kg of blast furnace slag, 3.2 kg of stone coal and 0.3 kg of iron chips. The yield of the metal is only 62%, i.e. 38% of the metal content get to the ash, a fact indicating that a high amount of slag arises from this process.

According to the United States patent specification No. 3,393,068, a silicon-base complex ferrous alloy can preferably be manufactured by preparing a first-type pellet or briquette (called hereinafter as pellet for the sake of simplicity) from at least the major part of the silicon dioxide to be reduced to silicon and from a coal having a medium coking capacity and taken in an amount enough to reduce the said silicon dioxide; further a second-type pellet is prepared from at least the major part of the ore to be reduced and from a coal having a medium coking capacity and taken in an amount enough to reduce the said ore. Then both said pellet types are heat-treated in such a way that the the said coal be at least partially coked and thereby transformed to a cellular, coked base material. The said first-type and second-type pellets are smelted together in a furnace to result in the said silicon-containing ferrous alloy. Thus, in the course of this process a charge consisting of one kind but two types of pellets is smelted by means of a carbothermal, one-stage method.

A drawback of this process is that, owing to the coking of the coal, the electric conductivity of the pellets is high and therefore, as mentioned in the patent specification, too, the smelting fails to proceed without the appearance of slag.

According to the Soviet patent specification No. 676,634, a silicon-base complex ferrous alloy can be prepared by a one-stage carbothermal process, without slag formation, by preparing a briquette which includes the total carbonaceous reducing agent and the ores containing the oxides of the main components, said briquette containing carbon in an amount which is 2.5 to 13 times higher than required to form the main components by reduction, but 1.03 to 1.25 times lower than required to reduce all components of the charge. Consequently, the silicon is also formed by reduction with the carbonaceous reducing agent contained in the briquette. Thus, within this process, a charge consisting of only one kind and one type of pellet and quartzite is smelted. The drawbacks of this process are as follows:

(a) By this process, unary alloys can mainly be prepared, however, there are some alloys of such type, e.g. FeSi(B), that cannot be produced without slag formation by using this method, as boron trioxide melts in the briquette because of its low melting point (723° C.) before its reduction to boron. The boron trioxide flowing out of the briquette together with the quartzite results in a low-melting slag. So the slag formation is inevitable and the process is not slag-free in spite of the statement of the specification. In addition, there are unary alloys, e.g. FeSi(Cr), or FeSi(Mn), containing a high quantity of chromium or manganese, respectively, and little silicon which cannot be produced by using this process because, according to the process, the briquette should contain at least 2.5 times as much of carbon as required to obtain the main component by reduction and silicon is formed by reduction with this high amount of carbon. This high quantity of silicon will always be present in the alloy; thus, no alloy can be prepared which contains silicon in a quantity lower than the alloy with this pre-determined silicon content does.

(b) In addition, the preparation of the binary alloys brings up the drawback that when the briquette contains together the oxide of the acid-forming or of the amphoteric and base-forming elements (e.g. aluminium oxide and calcium oxide), prior to the reduction to aluminium and calcium as main components, these oxides will react with each other to give a low-melting, stable compound (according to the Example $12CaO.7Al_2O_3$, melting point 1455° C.) flowing out of the briquette and forming together with the quartzite an even lower (1200° C.) emelting slag to cause a high increase in the slag formation. When the number of the main components is increased, the oxides present in the briquette as well as also the problems are multiplied and cannot be solved even by adding the suggested thirteen-fold excess of carbon. This fact is proved by the Soviet patent specification No. 648,635 according to which even FeSi cannot be produced without slag formation from a coke with a high ash content; the manufacture of a silicon-base complex ferrous alloy is nearly impossible in this way. The slag formation is initiated by the ash content of the coke notwithstanding that this ash content is significantly lower than the mixed oxide content of the briquette; of course, it is initiated by the relatively high, mixed oxide content of the briquette. Thus, this process is not suitable to prepare multi-component silicon-base complex ferrous alloys containing acid-forming and amphoteric elements together with base-forming ones.

(c) In this process the amount of carbon in the briquette is significantly higher than required to reduce the oxides. Thus, the resistance of the briquette will not be high even when the oxide is highly resistant, since the excess of carbon remains as coke and diminishes the resistance of the briquette and thereby that of the charge, too. In a low-resistance charge, the immersion of the electrodes is not deep; thus, in the charge column the separate (gasifying-out, coke- and carbide-forming, reducing) zones are restricted, and the time available is not enough for either removing the volatile components or forming coke and carbide or for the reduction. These factors lead to slag formation.

(d) Wastes containing carbide cannot be worked up by this process though thereby an important reduction of costs would be possible and the process could be economical.

The object of the invention is—by elimination of the drawbacks of the processes of the prior art—to provide a process for the preparation of silicon-base complex ferrous alloys from a charge by reduction in an electric arc furnace which makes possible: to utilize coals with a high ash content, slags and flue-dusts of power stations and carbide-containing wastes as cheap raw materials; to reduce the costs; to improve the quality and to widen the assortment of the alloys; as well as to increase the electric resistance of the charge.

A number of investigations have been carried out to realize these aims. It has been found that the pellet even in se should not contain an oxide liable to melt before its reduction to the element or to form a carbide since it would flow out of the pellet to produce together with the quartzite an eutectic with an even lower melting point, thereby making impossible the formation of the main component and silicon by reduction and leading to an inevitable slag formation. It has been proved by these experiments that, out of the important main components, only one has an oxide endowed of such properties: that is the boron trioxide ($B_2O_3$) melting at 723° C.

It has been found further that the pellet may not contain (consequently, not even in a lumpy form in the charge) two oxides that have a high melting point but are capable to form one or more low-melting compounds and/or eutectics with each other. The latter are formed before the reduction of the oxides, and the elements cannot be obtained by reduction from the melt. The melting point of calcium oxide is 2570° C. and that of aluminium oxide is 2050° C., i.e. both are high. However, these two substances result in the compound $12CaO.7Al_2O_3$ melting at 1455° C. and in two eutectics melting at 1395° C. and 1400° C., respectively. Thus, one single pellet may not contain these two substances together. Calcium oxide and aluminium oxide should be present in separate pellets even when the pellets contain more carbon than required to reduce the oxides present therein. This statement relates to other oxides, too. Thus, any given oxides should be contained in suitably assembled pellet types.

It has been proved by our experiments that the oxides of base-forming elements or the oxides of amphoteric elements or the oxides of acid-forming elements do not react with each other when their melting points are high and form eutectics only rarely which latter ones also have high melting points whereby carbides are formed from them before melting when they are contained in a pellet including somewhat more carbon than required to transform the oxides to carbides. The melting points of the carbides are also high and the carbides do not react with each other; thus, on decomposing these carbides by oxides, an alloy containing the element of the oxide and that of the carbide is formed. In addition to silicon dioxide, the oxides of the main components may also be used for decomposing the carbide; moreover, when the oxide of the main component is easier to reduce than silicon dioxide and both silicon and the other components are readily soluble in the main component or even the main component forms a low-melting metal compound or eutectic with the silicon and the other components, then the function exchange between silicon dioxide and the oxide of the main component is distinctly preferred. It has to be appreciated that the preparation of alloys with a low silicon content becomes possible only in this way.

On examining the proportion of the oxide to carbide present in the charge in a lumpy state, it has been found that the pellet may contain together the carbides and the oxides of acid-forming, amphoteric or base-forming elements if the amount of the carbon in the pellet is enough or somewhat higher than that required to transform the oxides of the pellet to carbides. Thus, a pellet may contain silicon carbide (SiC), boron carbide ($B_4C$), calcium carbide ($CaC_2$) together with titanium dioxide ($TiO_2$), with aluminium oxide ($Al_2O_3$) or barium oxide (BaO) since carbides (TiC or $Al_4C_3$ or $BaC_2$) are formed from the oxides in the carbide-forming zone during smelting when the amount of carbon available in the pellet is satisfactory. While smelting, the decomposition by oxides of the carbides arising in the pellet results in an alloy containing the metal element of the oxide and that of the carbide in the reducing melting zone.

On examining the carbonaceous reducing agent of the pellet, it has been found that the best results can be achieved with such pellets containing excess carbon, wherein the amount of carbon is 1.05 to 1.5 times, suitably 1.05 to 1.15 times higher than required to transform the oxides of the pellet to carbides. When the pellet contains a higher amount of the carbonaceous reducing agent, then the latter is coked, and the pellet containing excess carbon behaves similarly to the coke: its electrical resistance and thus also the resistance of the charge will not be high. Consequently, the immersion of the electrodes in the charge is diminished and the individual (gasifying-out, coking, carbide-forming and reducing) zones are restricted, whereby no enough time will be available for removing the volatiles, for forming coke and carbide and for the reduction. These factors lead to slag formation and to the deterioration of the heat utilization coefficient of the furnace; namely, the gases arising from the oxidation leave the furnace at a high temperature without giving off their heat content. Thus, the necessary excess of carbon should not be added to the pellet but to the charge, in the form of lumpy petroleum coke, charcoal, dry lignite, turf or wood chips with high electric resistance and low ash content. This is the single way to prepare a charge with a high resistance.

Finally, on examining the quartzite as charge component it has been found that it was not suitable in all cases. Namely, in some cases silicides having an extraordinarily high melting point are formed which cannot be removed from the furnace by discharge and thus no continuous operation can be assured. Silicides of such type are e.g. $Zr_2Si$ (melting point 2210° C.), $Zr_5Si_3$ (melting point 2210° C.), $Zr_4Si_3$ (melting point 2220° C.), $Ti_5Si_3$ (melting point 2120° C.), $V_3Si$ (melting point 2050° C.), $V_5Si_3$ (melting point 2150° C.) and $NbSi_2$ (melting point 1930° C.). Thus, on obtaining the elements of the above silicides by reduction, in order to inhibit their formation the charge should contain, instead of quartzite, the oxide of a main component dissolving both silicon and the metallic element of the silicide and/or resulting, by the formation of an eutectic, in a low-melting alloy that can easily be discharged, or an iron additive should be used. A further advantage of using this process, instead of increasing the temperature of the smelting limited by the melting point of the lining material of the furnace, is that the loss of silicon and metal arising from evaporation is lower, particularly in the case of magnesium, calcium, barium, manganese and chromium having a low boiling point each. When the oxide used instead of quartzite is lumpy, it may be a charge component (as is the quartzite); however, should it be dust-like, it should be pelletized: so-called carbon-deficient pellets should be prepared, i.e. the amount of carbon should be the 0.66 to 0.02 fold quantity of that required to reduce the oxides of the pellet to the elements.

Thus, a pellet should first be prepared for the process of the invention. As indicated above, the pellet may contain an excess of carbon. When this pellet type contains oxides and/or carbides of base-forming elements, then it is basic; when it contains oxides and/or carbides of amphoteric elements, then it is neutral; and when it contains oxides and/or carbides of acid-forming elements, then it is acidic. A mixed-type pellet (basic and neutral and acidic) cannot be prepared from oxides but it can be achieved by using the carbides of base-forming and/or amphoteric and/or acid-forming elements, or the oxides of amphoteric or acid-forming elements.

As mentioned above, the pellet may also be carbon-deficient, and the latter may also be basic, neutral or acidic.

Thus, the most important recognition of the invention is that the slag formation can only be avoided by preparing more kinds and even more types within one kind of pellets. Thus, a single pellet in se should not contain the oxides of all main components.

Based on the above, the invention relates to a process for the continuous preparation of silicon-base complex ferrous alloys from balled ores, coals with a high ash content, slags of power stations, carbon- and carbide-containing wastes and/or lumpy ores, carbides as well as carbon carriers with a high electric resistance, by preparing a charge with a high electric resistance and reducing the same in an electric furnace. The process of the invention comprises assembling a charge which contains the total amount of carbon in a 0.82 to 0.99-fold quantity of that required to reduce all oxides of the charge to elements and adjusting this carbon content by preparing pellets which, in addition to the binding material, contain (a) as oxide to be reduced in an amount of at least 50% by weight such oxides of only base-forming (a pellet of basic character), or of only amphoteric (a pellet of neutral character), or only of acid-forming (a pellet of acidic character) elements which form with each other compounds or eutectics melting above 1600° C., and (b) a carbonaceous reducing agent and/or carbides in such an amount that the quantity of carbon is either 1.05 to 1.35 times higher than required to transform the oxides of the pellet to carbides (pellets containing an excess of carbon) or 0.66 to 0.02-fold of the quantity required to reduce the oxides of the pellet to metallic elements, and assembling the charge ($\alpha$) from pellets containing an excess of carbon (of basic and/or neutral and/or acidic character) and/or from lumpy carbides and ($\beta$) from carbon-deficient pellets of basic or neutral or acidic character), or from a lumpy oxide of a base-forming or amphoteric or acid-forming element and ($\gamma$) from lumpy carbon carriers, and optionally ($\delta$) from an iron additive with the proviso that no pellet may contain boron trioxide, and boron trioxide may not be present even as a charge component.

The main advantages of the process are as follows:

(a) The utilization of cheap raw materials (materials with a high ash content, slags and flue-dusts of power stations, carbide-containing slags and wastes) for the preparation of silicon-base complex ferrous alloys becomes possible.

(b) By using cheap raw materials, the reduction of costs becomes possible without deterioration of the quality of the alloy whereby the production is rendered economical.

(c) The widening of the assortment of alloys and the preparation of novel alloys, which cannot be produced by the known procedures, become possible.

(d) The assembling of high-resistant charges becomes possible which results in the deeper immersion of the electrodes to the charge whereby the thickness of the separate (pre-heating, gasifying-out, carbide-forming, etc.) zones is increased, the heat utilization coefficient of the furnace is improved and, in conclusion, the electric power required to prepare one weight unit of the alloy is diminished.

(e) A more stable and continuous operation of the furnace becomes possible whereby an abrupt breaking down of the furnace run can be eliminated.

The process of the invention is illustrated in detail by the following Examples.

EXAMPLE 1

A FeSi(Ca) alloy containing 28 to 32% of calcium, 60 to 65% of silicon and 3 to 7% iron is prepared by using the following charge:
- A pellet with an excess of carbon (basic, containing 56 kg of calcined lime, 52 kg of gas coke and 4 kg of a binding material): 112 kg
- Quartzite, lumpy: 135 kg
- Charcoal, lumpy: 36 to 40 kg In this charge, the carbon amounts to 61.6 kg, instead of the theoretical value of 66.1 kg, i.e. it is present in a 0.93-fold quantity of that required to reduce all oxides of the charge to elements.

EXAMPLE 2

A FeSi(Cr) alloy containing 75 to 80% of chromium, 8 to 10% of silicon and 12 to 14% of iron is prepared by using the following charge:
- A pellet with an excess of carbon (acidic, containing 172 kg of quartz sand, 134 kg of coke and 12 kg of a binding material): 316 kg
- A carbon-deficient pellet (neutral, containing 1190 kg of a $Cr_2O_3$ concentrate and 90 kg of a binding material): 1280 kg
- Petroleum coke, lumpy: 253 kg
- Iron additive: 120 kg In this charge, the carbon amounts to 309 kg, instead of the theoretical value of 349 kg, i.e. it is present in a 0.88-fold quantity of that required to reduce all oxides of the charge to elements.

EXAMPLE 3

A FeSi(Al,Ca) alloy containing 50 to 55% of silicon, 24 to 27% of calcium, 14 to 17% of aluminium and 5 to 7% of iron is prepared by using the following charge:
- A pellet with an excess of carbon (neutral, containing 36 kg of bauxite, 18 kg of coke and 3 kg of a binding material): 57 kg
- A pellet with an excess of carbon (basic, containing 42 kg of calcined lime, 40 kg of coke and 3 kg of a binding material): 88 kg
- Quartzite, lumpy: 110 kg
- Wood chips: 45 to 55 kg In this charge, the carbon amounts to 62.1 kg, instead of the theoretical value of 69.4 kg, i.e. it is present in a 1.12-fold quantity of that required to reduce all oxides of the charge to elements.

EXAMPLE 4

An FeSi(Ti,Zr,Al,Ca) alloy containing 47 to 52% of silicon, 4 to 6% of titanium, 8 to 12% of zirconium, 14 to 16% of aluminium, 11 to 14% of calcium and 3 to 7% of iron is prepared by using the following charge:
- A pellet with an excess of carbon (acidic, containing 8.5 kg of rutile, 4.5 kg of coke and 0.5 kg of a binding material): 13.5 kg
- A pellet with an excess of carbon (neutral, containing 29 kg of bauxite, 26 kg of a coal with a high ash content and a low caloric value and 3 kg of a binding material): 58 kg
- A pellet with an excess of carbon (basic, containing 22 kg of calcined lime, 20 kg of coke and 4 kg of a binding material): 46 kg
- A carbon-deficient pellet (acidic, containing 20 kg of zirconium sand and 1 kg of a binding material): 21 kg
- Quartzite, lumpy: 106 kg
- Lignite: 40 to 45 kg In this charge, the carbon amounts to 55.4 kg, instead of the theoretical value of 65.83 kg, i.e. it is present in a 0.84-fold quantity of that required to reduce all oxides of the charge to elements.

EXAMPLE 5

A FeSi(Ti,Al,B,Ca) alloy containing 46 to 50% of silicon, 10 to 12% of titanium, 7 to 8% of aluminium, 11 to 14% of calcium, 10 to 12% of boron and 10 to 14% of iron is prepared by using the following charge:
- A pellet with an excess of carbon (acidic, containing 17 kg of rutile, 9 kg of coke and 1 kg of a binding material): 27 kg
- A pellet with an excess of carbon (neutral, containing 18 kg of bauxite, 9 kg of coke and 1.5 kg of a binding material): 29 kg
- A pellet with an excess of carbon (basic, containing 22 kg of calcined lime, 20 kg of coke, 14 kg of $B_4C$ wastes and 5 kg of a binding material): 59 kg
- Quartzite, lumpy: 103 kg
- Charcoal: 20 to 26 kg
- Iron wastes: 6 to 8 kg In this charge, the carbon amounts to 51.4 kg, instead of the theoretical value of 57.3 kg, i.e. it is present in a 0.897-fold quantity of that required to reduce all oxides of the charge to elements.

EXAMPLE 6

An alloy containing 24 to 26% of zirconium, 14 to 16% of silicon, 38 to 42% of manganese, 8 to 12% of calcium and 8 to 12% of iron is prepared by using the following charge:
- A pellet with an excess of carbon (acidic, containing 70 kg of zirconium sand, 29 kg of coke and 9 kg of a binding material): 108 kg
- A carbon-deficient pellet (basic, containing 71 kg of a manganese ore and 6 kg of a binding material): 77 kg
- Calcium carbide, lumpy: 25 kg
- Lignite: 2 to 6 kg In this charge, the carbon amounts to 31.2 kg, instead of the theoretical value of 34.2 kg, i.e. it is present in a 0.91-fold quantity of that required to reduce all oxides of the charge to elements.

EXAMPLE 7

An alloy containing 12 to 16% of calcium, 15 to 20% of aluminium, 4 to 6% of boron, 50 to 55% of silicon and 5 to 10% of iron is prepared by using the following charge:

- A pellet with an excess of carbon (neutral, containing 62 kg of a coal with a high ash content, 10 kg of bauxite, 6.4 kg of $B_4C$ and 8 kg of a binding material): 86 kg
- A pellet with an excess of carbon (basic, containing 28 kg of slags of a power station, 16 kg of coke and 5 kg of a binding material): 49 kg
- Quartzite: 107 kg
- Lignite: 6 to 10 kg In this charge, the carbon amounts to 73.2 kg, instead of the theoretical value of 78.6 kg, i.e. it is present in a 0.93-fold quantity of that required to reduce all oxides of the charge to elements.

What we claim is:

1. A process for the preparation of alloys of at least three metals of which two are iron and silicon, comprising
   forming pellets containing at least about 50% by weight of an oxide of at least one said metal and a carbonaceous reducing agent in an amount such that the quantity of carbon is either 1.05 to 1.35 times higher than that required to transform said oxide to carbide or 0.66 to 0.02 times the quantity required to reduce said oxide, the pellets melting upon heating at a temperature no lower than 1600° C.;

assembling a charge comprised of
   (a) said pellets
   (b) carbon-deficient lumps or pellets of an oxide of a said metal other than the metal of the first-mentioned pellets, and
   (c) a lumpy carbonaceous material;

the charge being free from boron trioxide and containing carbon in an amount equal to 0.82 to 0.99 times the quantity necessary to reduce all oxides of the charge; and reducing the charge in an electric arc furnace.

2. A process as claimed in claim 1, in which the charge contains also an iron additive.

* * * * *